(12) United States Patent
Tucker et al.

(10) Patent No.: US 8,325,898 B2
(45) Date of Patent: Dec. 4, 2012

(54) SYSTEM AND METHOD FOR SCREENING INCOMING TELEPHONE CALLS

(75) Inventors: Curtis Tucker, Lee's Summit, MO (US); Shekhar Gupta, Overland Park, KS (US); Robert Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1106 days.

(21) Appl. No.: 12/172,829

(22) Filed: Jul. 14, 2008

(65) Prior Publication Data

US 2010/0008489 A1    Jan. 14, 2010

(51) Int. Cl.
*H04M 3/42* (2006.01)

(52) U.S. Cl. .................... 379/210.02; 379/88.19

(58) Field of Classification Search ............... 379/67.1, 379/88.13, 201.01, 207.02–207.09, 211.01, 379/196, 88.12, 88.18, 88.19, 210.02, 373.01
See application file for complete search history.

(56) References Cited

U.S. PATENT DOCUMENTS

| | | | |
|---|---|---|---|
| 5,467,388 A * | 11/1995 | Redd et al. | 379/210.02 |
| 5,828,742 A * | 10/1998 | Khalid et al. | 379/199 |
| 6,226,379 B1 * | 5/2001 | Swan et al. | 379/373.02 |
| 7,027,579 B1 * | 4/2006 | McDonald et al. | 379/211.01 |
| 2004/0223599 A1 * | 11/2004 | Bear et al. | 379/207.02 |
| 2009/0323907 A1 * | 12/2009 | Gupta et al. | 379/88.13 |

* cited by examiner

*Primary Examiner* — Khai N Nguyen
(74) *Attorney, Agent, or Firm* — Patton Boggs LLP

(57) ABSTRACT

A do-not-disturb mode is entered in response to an identifier and a first authorization code is received. A call is received from a caller whereafter the caller is prompted to input a second authorization code. If the first and second authorization codes are the same, a notification is generated to notify a called party that a telephone call is being received.

12 Claims, 4 Drawing Sheets

SYSTEM AND METHOD FOR SCREENING INCOMING TELEPHONE CALLS

BACKGROUND

The use and development of communications has grown nearly exponentially in recent years. The growth is fueled by larger networks with more reliable protocols and better communications hardware available to service providers and consumers. Users have similarly grown to expect better communications from home, work, and "on-the-go". For example, users now expect faster connection speeds, increased bandwidth, better reliability, and greater availability from all types of communications networks. In many cases, the growth is driven by people looking to give up traditional communications schemes for the efficiency, effectiveness, and availability of new networks. The growth of caller identification and voicemail are examples of communications methods that are simple and effective. Despite the growth in the communications field, the methods for using do-not-disturb features and presenting caller identification are still quite limited to traditional methods and configurations.

One example of communications technology that has not adapted to new trends and technologies is the ability to screen incoming calls. Typically, a user screens a call by either checking the caller identification information for the incoming call prior to answering the call or allowing the incoming call to be forwarded to voicemail, whereby the user listens to a message, if one is left, then returns the caller's call. In either case, the incoming call may cause the telephone to ring, thereby disrupting what the user is doing (e.g. watching television, eating dinner, sleeping, etc.). Moreover, if the incoming call is urgent, screening calls as outlined above may consume valuable time. Thus, there is a significant need for a system and method for screening incoming telephone calls that is efficient and less intrusive.

SUMMARY

To limit incoming calls for certain periods of time, systems and methods for screening incoming calls are presented. In one embodiment, a do-not-disturb mode is entered in response to receiving an identifier and a first authorization code. When a call is received from a caller, the caller is prompted to input a second authorization code. If the first and second authorization codes are the same, a notification that a call is being received is generated to notify a called party of the call.

In another embodiment, a telecommunications device may include an input/output device configured to receive telephone calls from callers, a memory configured to store the set of instructions, and a processor configured to execute the set of instructions. The instructions cause the processor to activate a do-not-disturb feature for a telephone; establish a first authorization code; prompt a caller to input a second authorization code; and generate a notification to a called party if the first authorization code and the second authorization code are the same.

In yet another embodiment, a system may include an electronic display and a telecommunications device. The telecommunications device has an input/output device configured to receive telephone calls from callers, a memory configured to store the set of instructions, and a processor configured to execute the set of instructions. The instructions cause the processor to: activate a do-not-disturb feature for a telephone, establish a first authorization code, prompt a caller to input a second authorization code, and generate a notification if the first authorization code and the second authorization code are the same. The system may also include a set-top box in communication with the electronic display and the telecommunications device. The set-top box is operable to receive the generated notification from the telecommunications device and transmit the notification to the electronic display for a called party to review.

BRIEF DESCRIPTION OF THE DRAWINGS

Illustrative embodiments of the present invention are described in detail below with reference to the attached figures, which are incorporated by reference herein and wherein.

DETAILED DESCRIPTION OF THE DRAWINGS

While the systems and methods are described with reference to several illustrative embodiments described herein, it should be clear that the present invention should not be limited to such embodiments. Therefore, the description of the embodiments provided herein is illustrative of the present invention and should not limit the scope of the invention as claimed.

In one embodiment of a system for screening telephone calls, one or more home telephones are in communication with a network server by way of a communications network. Each home telephone may be configured to command the server to enter a do-not-disturb mode and provide the server with an authorization code, whereby callers using outside lines are prompted to properly enter the authorization code before their calls are passed through to the home telephones. In addition, if the code has been properly entered, the server may generate a notification code that is transmitted to the home telephones, thereby allowing a user or called party to determine if he or she would like to answer the call. If the caller is unable to properly enter the authorization code or if the user decides not to answer the call after receiving notification from the server, the call may be forwarded to voicemail. In an alternative embodiment, the server is provided with a set of approved telephone numbers whereby a call received from one of the approved numbers is prompted to enter the authorization code; otherwise, calls from unapproved numbers are forwarded directly to voicemail. In yet another alternative embodiment, the system may employ programmable smart phones that perform the functions of the aforementioned server, thereby eliminating the need for such a server.

Figure 1:
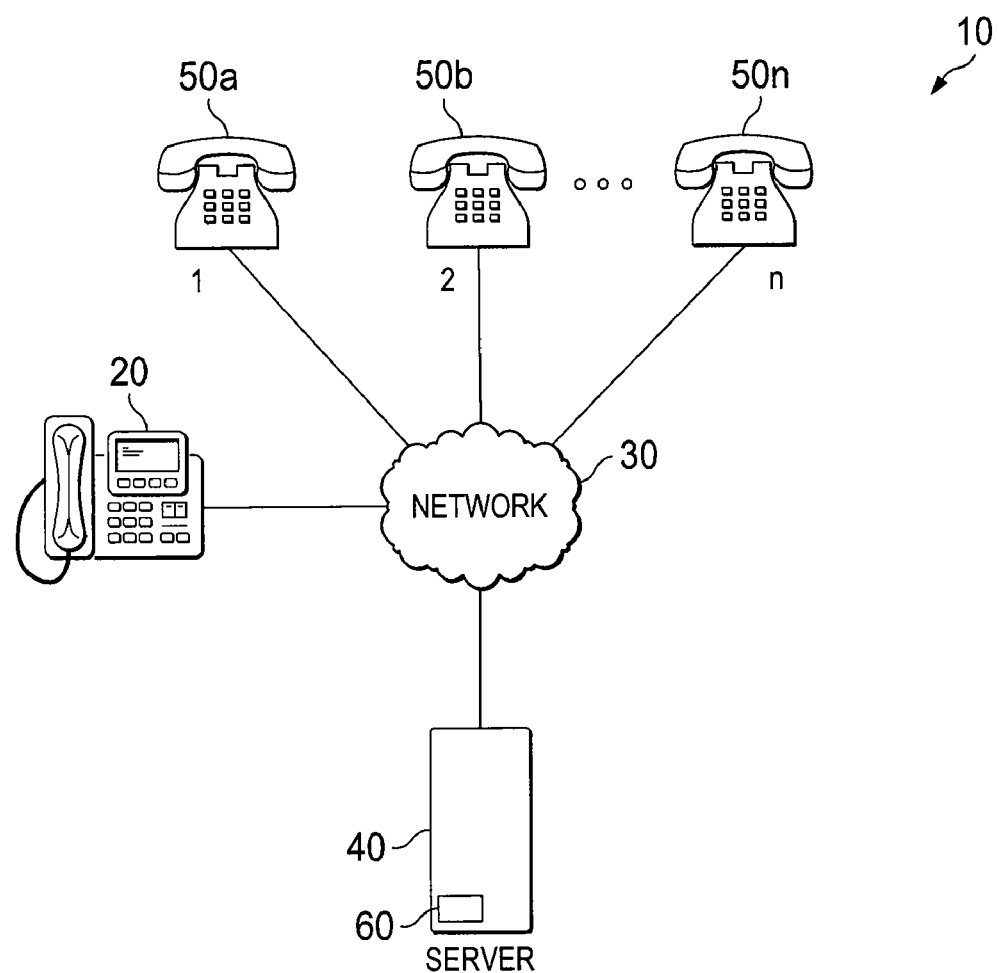
FIG. 1 is an illustration of an exemplary network for screening incoming telephone calls.

Referring now to FIG. 1, an illustrative system 10 is shown. The system 10 may include one or more home telephones 20, a communications network 30, a network server 40, and a plurality of outside telephones 50a-50n (collectively 50). The different elements and components of the system 10 may communicate with one another using wireless communications or hardwired connections, such as fiber optics, cable, DSL, telephone lines, and other similar connections.

The communications network 30 may include any number of networks capable of providing communications between the home telephone(s) 20, server 40, and outside telephones 50. For example, the communications network may be one or more, or any combination of, wireless networks, data or packet networks, publicly switched telephone networks (PSTN), etc.

The home telephone(s) 20 may include any suitable telecommunications device, including, but not limited to, standard analog telephones, cordless telephones, VoIP telephones, DECT telephones, smart telephones or wireless devices, such as cellular telephones, personal digital assistants (PDA), communications enabled mp3 players, etc. Likewise, the outside telephones 50 may include any similar telecommunications device that an outside caller may use in an attempt to contact the home telephone(s) 20.

The network server 40 may be any server or device configured to process commands from the home telephone 20 and to facilitate communications between each home telephone 20 and the outside telephones 50. The server 40 may include one or more software modules 60, whereby a user may selectively enter a do-not-disturb mode and provide the server 40 with an authorization code that callers are to enter in order to have a call be passed to a called party. Callers using outside telephones 50 may be prompted to enter the authorization code before the calls are forwarded to the home telephone(s) 20. Alternatively, a caller may enter a pre-fix that includes the authorization code (e.g., "123") when dialing a home telephone 20.

Figure 2:
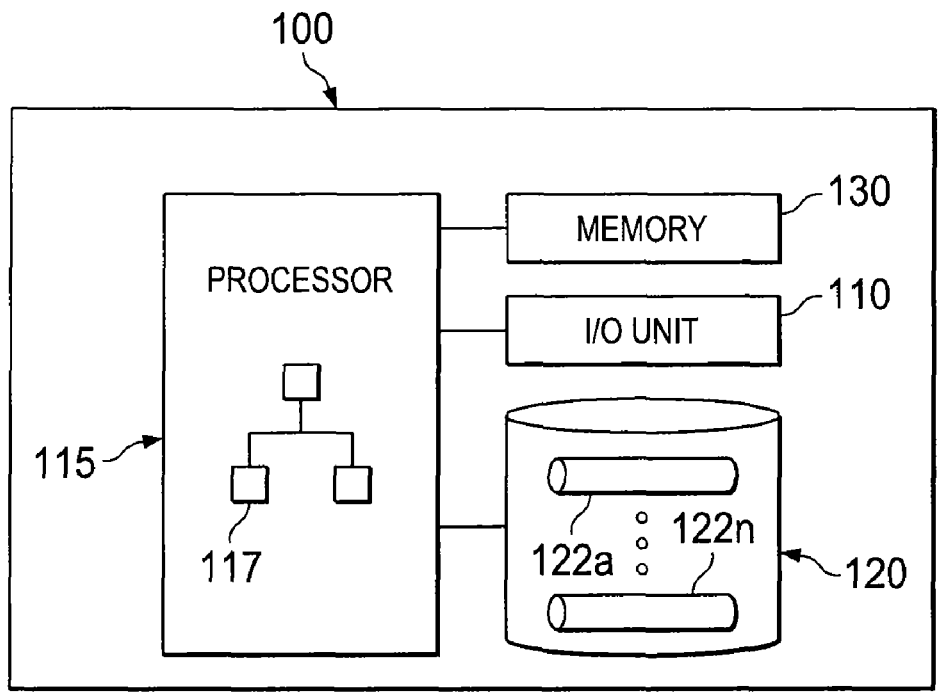
FIG. 2 is a block diagram of an exemplary application server configured to assist in screening incoming telephone calls.

FIG. 2 is a block diagram of exemplary components 100 of a network server 40 of FIG. 1. The server may include an input/output (I/O) unit 110 for receiving commands and communicating data to a home telephone and/or outside telephones. The server may also include a processor 115 for processing commands from a home telephone and/or outside telephones. The processor 115 may execute one or more software modules 117 such that a user may selectively enter a do-not-disturb mode and provide the server with an authorization code, whereby callers using outside telephones may be prompted to properly enter the authorization code before their calls are passed through to the home telephones. The functions of the do-not-disturb mode and authorization code, as well as other software modules 117, are further described in greater detail below.

A storage unit 120 may also be included in the server. The storage unit 120 may be a hard drive or any other type of non-volatile memory capable of storing data. Within the storage unit 120 may be one or more databases 122a-122n capable of storing and organizing data, such as the authorization code, telephone numbers of approved callers, etc. Memory 130 may also be located within the server for storing data being processed by the processor 115. In one embodiment, rather than including a storage unit 120, the server may use memory 130 that is large enough to store sufficient content for the typical use of the server. In an alternative embodiment, at least one home telephone is provided with the aforementioned components and software, thereby eliminating the need for the network server. In an alternative embodiment, a softphone operating on a computer may be configured with the same or analogous modules (FIG. 3) to provide the functionality described herein.

Figure 3:
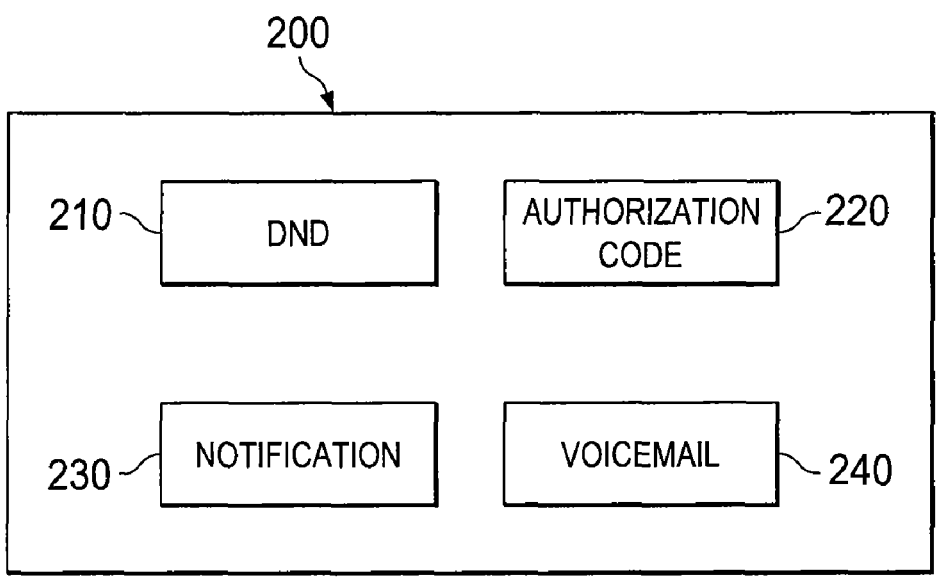
FIG. 3 is a block diagram of exemplary software modules for screening incoming telephone calls.

FIG. 3. is a block diagram of exemplary software modules 200 that may be included in the server 40 of FIG. 1. Alternatively, the software modules 200 may be distributed over a plurality of servers. In yet another alternative, one or more of the software modules 200 may be stored and executed on one or more of the home phones. The following modules 200 are exemplary in nature and not intended to limit the scope of the invention; thus, it will be fully appreciated that a system may employ any suitable number of software modules and remain within the scope of the invention.

The do-not-disturb module 210 may be executed to alternate between an open-call mode, whereby calls ate forwarded directly to a home telephone, and a do-not-disturb mode, whereby incoming calls initiate the execution of the authorization code module 220. The user of a home telephone may use the home telephone to alternate between the open-call mode and the do-not-disturb mode. Alternatively, the do-not-disturb module may be programmed to enter a do-not-disturb mode at one or more specific times of the day, one or more days of the week, etc. In yet another alternative, the do-not-disturb mode may be activated when the home telephone is using a first line of a call-waiting enabled telephone or system.

The authorization code module 220 may be initially executed to receive a first authorization code from a user of a home telephone. In an alternative embodiment, the authorization code module 220 may be executed to receive a set of authorization codes, where each authorization code corresponds to a specific phone number of a caller, a specific person, a specific household, or the like. In one embodiment, the authorization code module 220 may be configured to receive a set of telephone numbers, whereby only calls received from one of the numbers in the set are prompted for a second authorization code; otherwise, calls from numbers other than those in the set may initiate the voicemail module 240.

Additionally, the authorization code module 220 may be subsequently executed to prompt a caller for a second authorization code when the server is in a do-not-disturb mode. The authorization code module 220 may then compare the first and second authorization codes. If the first and second authorization codes ate the same, a notification module 230 may then be initiated. However, if the first and second authorization codes are different, the voicemail module 240 may be initiated.

The notification module 230 may be executed in response to a caller properly entering the authorization code. The notification module 230 may be configured to notify a home telephone when a caller has properly entered an authorization code. The notification may include an audio signal that is played as a tone by the home telephone. In addition, or alternatively, the notification may include caller ID information relating to the call. In one embodiment, the notification is displayed on the display of the home telephone or other electronic display in communication therewith. In another alternative, the notification may cause a home telephone to vibrate upon receiving the notification. If the call is not answered by a called party at the home telephone after a period of time (e.g., three rings, etc.), the voicemail module 204 may be initiated.

The voicemail module 240 may be executed in response to a caller that enters an incorrect authorization code (e.g., the caller entered/second authorization code does not match a user entered/first authorization code) or in response to a call not being answered for a period of time after a notification has been generated by the notification module 230. The voicemail module 240 may be configured to record a message from a caller that may be subsequently retrieved by a user of a home telephone. While the forgoing description employs software modules, it will be appreciated that the various functions described may be implemented by hardware, software, firmware, middleware, microcode, or a combination thereof and remain within the scope of the principles of the present invention.

Figure 4:
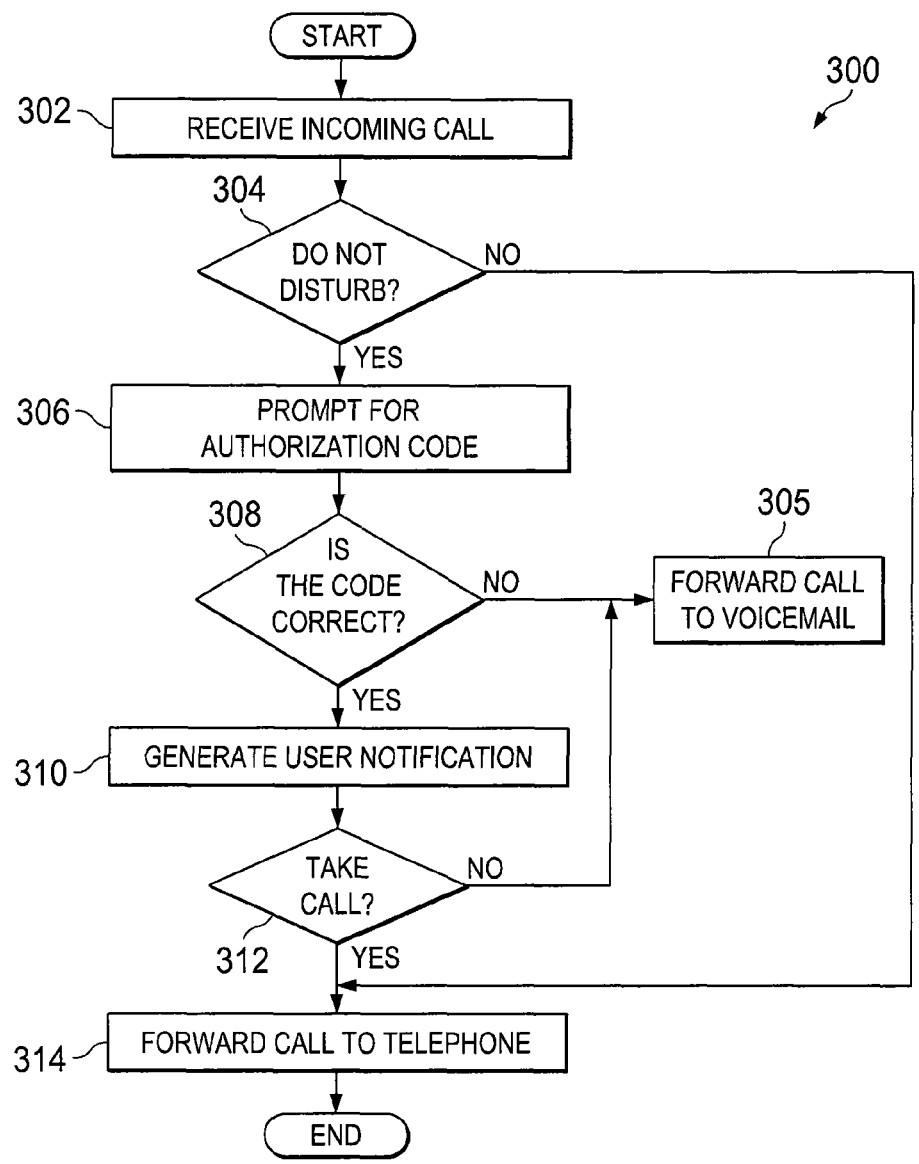
FIG. 4 is a flow diagram of an exemplary process for screening incoming telephone calls.

FIG. 4 is a flow chart of an exemplary process 300 for selectively screening telephone calls. The process 300 may be implemented by a server, home location register (HLR), class 5 switch, wireless device, VoIP telephone, standard telephone, other advanced intelligence network device, or any combination thereof, generally referred to herein as the "device." The process 300 begins by receiving an incoming telephone call from a calling party (step 302). Next, the device determines if the device is in a do-not-disturb mode (step 304). The device may be entered into a do-not-disturb mode based on prior user input. For example, the user may enter the device into a do-not-disturb mode by pressing a button on the device or another device in communication therewith, entering a code, or otherwise generating a signal or providing input used to enter the device into a do-not-disturb mode. Alternatively, the device may be programmed to enter a do-not-disturb mode at one or more specific times of the day, day(s) of the week, when a first line of a call-waiting enabled device is in use, etc. In addition, entering the do-not-disturb mode may also include the user entering one or more user authorization codes therewith (also referred herein as a "first authorization code"). Alternatively, the device may be programmed with one or more authorization codes at a previous time, whereby entering a do-not-disturb mode may cause the authorization code to become "active." If the device determines that the device is not in a do-not-disturb mode, the call may be forwarded to the device, or other device in communication therewith, whereby a user may answer the call (step 314). Alternatively, if the device determines that the device is in a do-not-disturb mode, the device prompts the caller to enter a second authorization code (step 306). The prompting may be in the form of an interactive audio or text format.

In response to receiving the second authorization code entered by the caller, the device determines if the first authorization code and second authorization code are the same (step 308). If the first and second authorization codes are not the same, the call is forwarded to voicemail (step 305). If the device determines that the first and second authorization codes are the same, the device generates a notification to notify a user that the device has received a call from a caller that has properly entered the authorization code (step 310). The notification may include an audio signal that is played as a tone by the device or other device in communication therewith. In addition, or alternatively, the notification may include caller ID information relating to the call. In one embodiment, the notification is displayed on the display of device or other electronic display in communication therewith. In another embodiment, the notification may cause the device to vibrate upon receiving the notification. Also, in one embodiment, while the device is generating such a notification, the incoming call may be placed on hold.

Next, the user may determine if he or she will answer the call and notify the device of such a determination (step 312). For example, the user may notify the device that he or she will or will not answer the telephone by pressing a button on the device or another device in communication therewith, entering a code, or otherwise generating a signal or providing input used to make the determination. If the user decides to take the call, the call may be forwarded to the device, or other device in communication therewith, whereby a user may answer the call (step 314). If the user does not make a determination within a certain amount of time or if the user decides not to answer the call, the call may be forwarded to voicemail (step 305).

Figure 5:
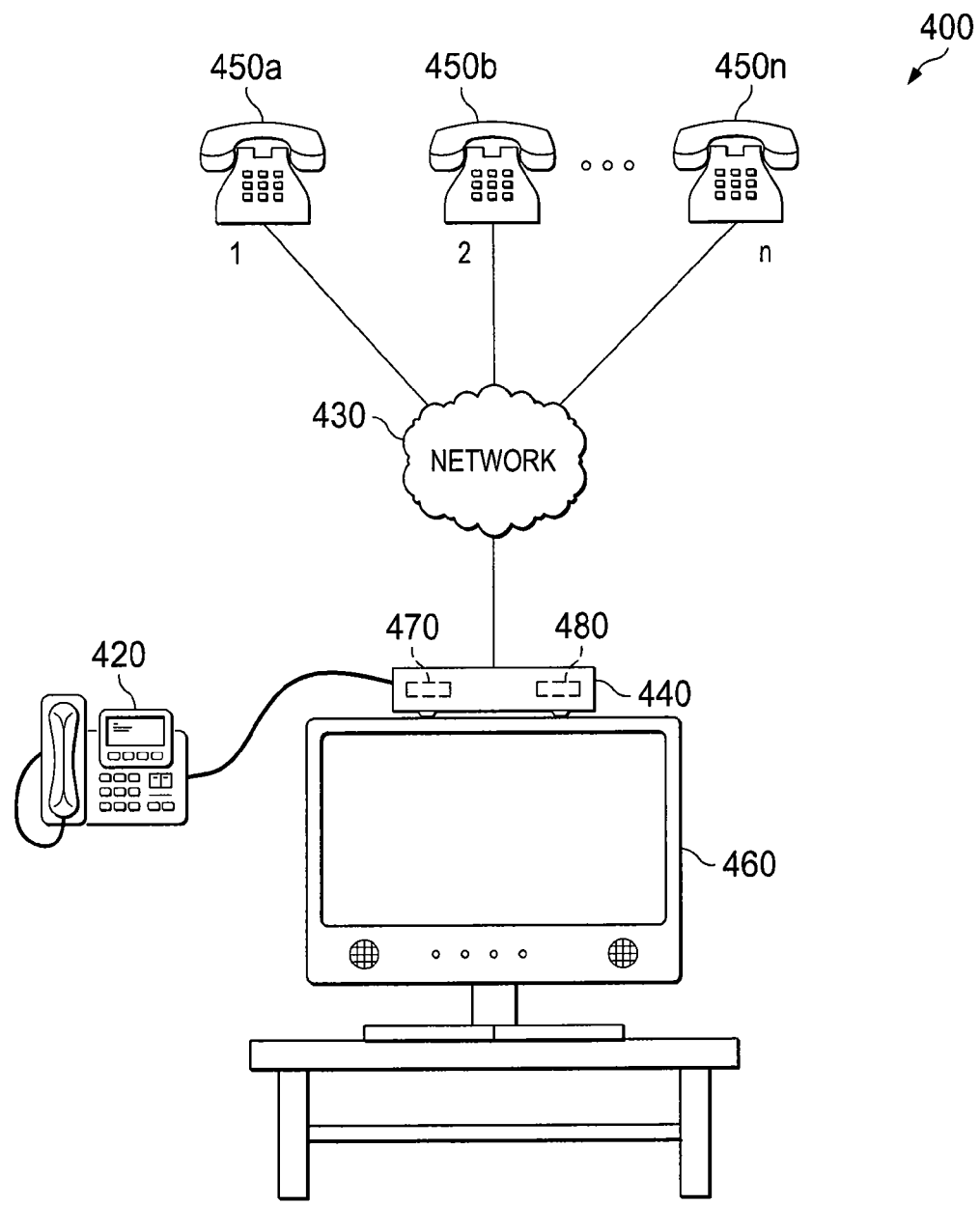
FIG. 5 is an illustration of a second exemplary network for screening incoming telephone calls.

Referring now to FIG. 5, an alternative system 400 for screening telephone calls is shown. The home telephone(s) 420, outside telephones 450a-450n (collectively 450) and network 430 are similar to those shown and described in FIG. 1. One or more home telephones 420 is in communication with a set-top box 440 or other television equipment. The set-top box 440 may be any suitable device capable of receiving an external signal and converting the signal into content for display by an electronic display device 460 as well as provide communication between the home telephone(s) 420 and electronic display 460. The set-top box 440 may also be configured to provide communication between the home telephone(s) 420 and the outside telephones 450. In one embodiment, the set-top box 440 is an IPTV set-top box. The electronic display 460 may be any suitable display device, including but not limited to a plasma television, LCD television, computer monitor, projector, etc.

The set-top box 440 may be provided with components 470 similar to those of FIG. 2 as well as be provided with middleware 480 for providing functions similar to those shown and described in FIG. 3. While the illustrative embodiment employs middleware 480, it will be appreciated that the various functions described may be implemented by hardware, software, firmware, modules, microcode, or a combination thereof and remain within the scope of the present invention. Alternatively, at least one home telephone 420 may be provided with all or some of the components and/or configured to provide similar functionality via middleware, etc. In yet another embodiment, the system 400 may be provided with a server (not shown) similar to the server shown and described in FIGS. 1-3.

The system 400 may be configured to follow a process similar to that outline in FIG. 4. In brief, a user may program the system 400 to enter into a do-not-disturb mode. For example, the user may enter the system 400 into a do-not-disturb mode by pressing a button on or entering a code with at least one of the home telephone(s) 420, set-top box 440 or remote control (not shown) in communication with the set-top box 440, or otherwise generating a signal or providing input to used to enter the system 400 into a do-not-disturb mode. Alternatively, the system 400 may be programmed to enter a do-not-disturb mode at one or more specific times of the day, when a first line of a call-waiting enabled device, such as a home telephone 420, is in use, etc. In addition, entering the do-not-disturb mode may also include the user entering one or more user authorization codes therewith (also referred herein as a "first authorization code"). Alternatively, the device may be programmed with one or more authorization codes at a previous time whereby entering a do-not-disturb mode may cause the authorization code to become "active." When the system 400 is not in a do-not-disturb mode, incoming calls are forwarded to the home telephones 420.

However, if the system 400 is in a do-not-disturb mode, outside callers are prompted to enter a second authorization code. The system 400 then compares the first and second authorization codes. If the first and second authorization codes are different, the call is forwarded to voicemail. If the first and second authorization codes match, the system 400 generates a notification code to notify the user that the system has received a call from an authorized caller. In the exemplary embodiment, the notification is displayed on the screen and/or audibly communicated from a speaker of the electronic display 460. The notification may include the caller ID information for the caller such as name, telephone number, etc. Additionally, but not necessarily, the notification may also cause a home telephone 420 and/or remote control to vibrate, display caller ID information for the caller, etc.

The user may then determine if he or she will take the call. For example, the user may notify the system 400 that he or she will or will not answer the call by pressing a button on a home telephone 420, the set top box 440, remote control, or other device in communication therewith, entering a code, or otherwise generating a signal or providing input used to make the determination. If the user decides to take the call, the call may be forwarded to the home telephone(s) 420. If the user decides not to take the call or does not make a determination within a certain period of time, the call may be forwarded to voicemail.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

The invention claimed is:

1. A method for screening telephone calls, comprising:
   receiving, by a system having a processor, a set of telephone numbers to be used in screening the telephone calls;
   entering, by the system, a do-not-disturb mode for a first communication device of a user in response to the system receiving an identifier from the user;
   in response to entering the do-not-disturb mode, requesting and receiving a first authorization code from the user;
   receiving a call to the first communication device from a second communication device of a caller;
   in response to a determination that a telephone number associated with the second communication device is in the set of telephone numbers, prompting the caller to input a second authorization code;
   in response to a determination that the telephone number associated with the second communication device is not in the set of telephone numbers, routing the call to a voicemail system;
   generating, using the processor, a notification in response to a determination that the first authorization code and the second authorization code are the same and then placing the caller on hold;
   otherwise, in response to a determination that the first authorization code and the second authorization code are not the same, forwarding the call to the voicemail system;
   in response to the notification, determining whether a user-entered code is received within a predetermined time period,
   in response to a determination that the user-entered code is received within the predetermined time period, connecting the call to the first communication device; and
   in response to a determination that the user-entered code is not received within the predetermined time period, forwarding the call to the voicemail system.

2. The method of claim 1 further comprising forwarding the call to voicemail if the first authorization code and the second authorization code are not the same.

3. The method of claim 1 further comprising forwarding the call to voicemail if the call is not answered after the notification is generated.

4. The method of claim 1 wherein generating the notification includes displaying the notification on an electronic display.

5. The method of claim 1 wherein generating the notification includes generating an audible tone to notify a user that a call is being received.

6. The method of claim 1 wherein generating the notification includes displaying caller ID information of the caller for a user to view.

7. A telecommunications device for enabling selective screening of incoming telephone calls, comprising:
   an input/output unit configured to receive telephone calls from callers;
   a memory configured to store a set of instructions;
   a processor configured to execute the set of instructions, wherein the set of instructions cause the processor to:
     receive a set of telephone numbers to be used in screening the telephone calls;
     activate a do-not-disturb feature for a telephone of a user in response to receiving an identifier from the user indicating a request to activate the do-not-disturb feature for the telephone;
     request and establish a first authorization code in response to activating the do-not-disturb feature-mode;
     in response to receiving a call from a second communication device of a caller, determine whether a telephone number associated with the second communication device in the set of telephone numbers;
     in response to a determination that the telephone number associated with the second communication device is in the set of telephone numbers, prompt the caller of the second communication device that is placing the call to the telephone to input a second authorization code in response to the do-not-disturb feature being activated on the telephone at a time of the call;
     in response to a determination that the telephone number associated with the second communication device is not in the set of telephone numbers, routing the call to a voicemail system; and
     generate a notification to the user in response to a determination that the first authorization code and the second authorization code are the same and then placing the caller on hold;
     otherwise, in response to a determination that the first authorization code and the second authorization code are not the same, forwarding the call to the voicemail system;
     in response to the notification, determining whether a user-entered code is received within a predetermined time period,
     in response to a determination that the user-entered code is received within the predetermined time period, connecting the call; and
     in response to a determination that the user-entered code is not received within the predetermined time period, forwarding the call to the voicemail system.

8. The device of claim 7 wherein the set of instructions further cause the processor to forward the call to voicemail if the first authorization code and the second authorization code are not the same.

9. The device of claim 7 wherein the set of instructions further cause the processor to forward the call to voicemail if the call is not answered after the notification is generated.

10. The device of claim 7 wherein the generated notification includes an audio signal.

11. The device of claim 7 wherein the generated notification includes caller ID information of the caller.

12. The device of claim 7 wherein the generated notification includes a video signal.

* * * * *